S. A. COGSDILL.
MACHINE FOR GRINDING TOOLS.
APPLICATION FILED AUG. 24, 1918.

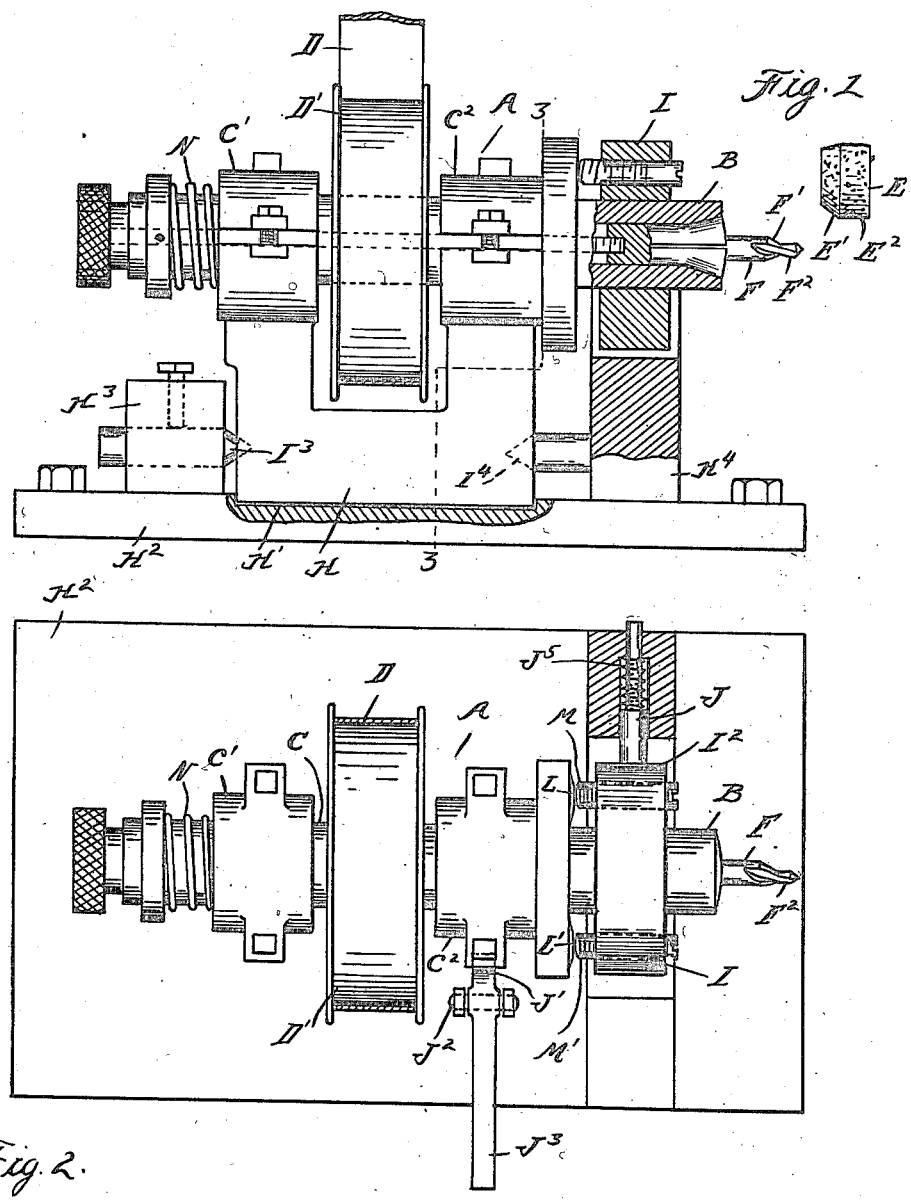

1,323,452.

Patented Dec. 2, 1919.
2 SHEETS—SHEET 2.

Inventor
Stuart A. Cogsdill

By Whittemore Hulbert & Whittemore
Attorneys

UNITED STATES PATENT OFFICE.

STUART A. COGSDILL, OF DETROIT, MICHIGAN.

MACHINE FOR GRINDING TOOLS.

1,323,452.  Specification of Letters Patent.  Patented Dec. 2, 1919.

Application filed August 24, 1918. Serial No. 251,225.

*To all whom it may concern:*

Be it known that I, STUART A. COGSDILL, a citizen of the United States of America, residing at Detroit, in the county of Wayne and State of Michigan, have invented certain new and useful Improvements in Machines for Grinding Tools, of which the following is a specification, reference being had therein to the accompanying drawings.

This invention relates to a machine for grinding tools and refers more particularly to an improved apparatus and method for forming combined drills and countersinks, although the invention in its broader aspects is not necessarily limited to the particular tools mentioned.

The main object of the invention is to provide an apparatus whereby the necessary radial relief can be automatically given to the tool when it is ground.

Another object of the invention is to provide an apparatus which can be used either in originally forming the tools or regrinding broken or injured tools.

The invention also resides in the novel arrangement for giving a greater radial relief to the countersink than to the drill portion of the tool, and in such further features of construction and operations as will more fully hereinafter appear.

In the drawings:

Figure 1 is a side elevational view, partly in section, of a machine embodying my invention;

Fig. 2 is a top plan view, partly in section, of the construction shown in Fig. 1;

Figure 3:
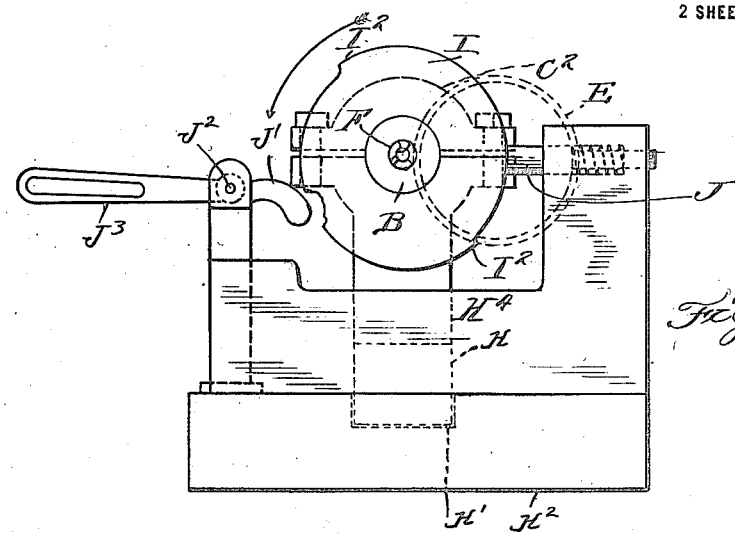
Fig. 3 is an enlarged cross-section on line 3—3 of Fig. 1.
Figure 4:
Fig. 4 is an enlarged elevational view of one of the tools.
Figure 6:
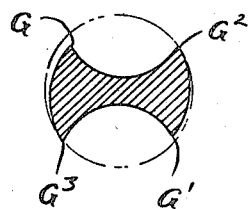
Figs. 5 and 6 are enlarged detail views of the tool shown in Fig. 4.
Figure 5:
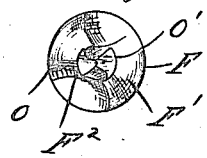

Describing in detail the apparatus shown in the drawings, A designates a tool holder having a chuck B carried by the revoluble shaft C. The latter is mounted in bearings $C'$ and $C^2$ and is driven by a suitable belt D extending over the pulley $D'$. E designates a grinding wheel which is located in a position to engage the tool F when the latter is positioned within the chuck. While the form of the grinding wheel E will, of course, vary with the particular tool to be operated on, it is shown as having a beveled portion $E'$ for grinding the countersink part $F'$ of the tool and a straight grinding circumference $E$ for grinding the drill portion $F^2$ of the tool. In certain classes of work it is essential that the cutting portions of the tool be provided with a radial relief, that is, so formed that the distance between the rear edges G and $G'$ is less than that between the cutting edges $G^2$ and $G^3$. In other words, the last mentioned edges are formed on a part of greater diameter than the rear edges. In this way any tendency to bind the drill point is avoided, and it is among the chief purposes of this machine to provide a process and apparatus for automatically forming the radial relief portions when the drill is ground. For this purpose the work-holding chuck B is arranged to be given a lateral motion at certain predetermined portions of rotation of the work.

As shown in Figs. 1 and 3 the bearings $C'$ and $C^2$ are carried by a frame H which, at its lower end, loosely fits in a seat $H'$ in the bed plate $H^2$. This frame H is pivoted to the uprights $H^3$ and $H^4$ by pivots $I^3$ and $I^4$ so as to have a slight rocking movement.

Secured to the shaft C is a ring or plate I which at two points in its circumference is slightly enlarged to form cam surfaces $I^2$. At one side of the rotatable ring or plate I there is located a spring-pressed stop J against which the ring or plate I is pressed whenever the cam $J'$ is rocked about its pivot $J^2$ by the operator pressing down on the handle of the lever $J^3$. Thus the upward movement of the cam $J'$ will rock the frame H about its pivots $I^3$ and $I^4$ and force the ring I against the stop J and compress the spring $J^5$.

The arrangement of parts as above described is such that as the work holder B rotates through each revolution it will, by the registration of the cam portions $I^2$ with the stop J, be given a positive movement toward the right during each revolution. This will carry the drill or other tool which is being ground away from the grinding wheel while the cutting edges $G^2$ and $G^3$ are being formed. As soon, however, as the cam portions $I^2$ move out of engagement with the stop J, the action of the cam $J'$ will rock the plate I and the frame H toward the left and thus carry the tool into closer grinding engagement with the surface $E^2$ of the grinding wheel E. In this manner the portion in the rear of the cutting edge will be ground off deeper so as to provide the necessary radial relief.

Where combined drills and countersinks are being formed, it is often desirable that the countersink portion, because of its greater diameter, be given a greater radial relief than the drill. This is accomplished in the same machine and by the same mechanism in the following manner:

In addition to the cam for rocking the frame H to the side, there are also employed adjustable cams M and M' which twice during each revolution register with the stationary cams L and L'. The cams M and M' are carried by the wheel I or other suitable mechanism which rotates with the shaft C. The latter is normally longitudinally withdrawn toward the left of the frame by means of the spring N, the arrangement of parts being such that while the cutting edges G² and G³ of the drill and the cutting edges O and O' of the countersink are being formed, the frame H will be rocked toward the left of Fig. 2 and the shaft C and work holder B also withdrawn by the spring N to the position shown in Fig. 1. However, as the shaft C rotates the cams M and M' will come into registration with the cams L and L', forcing the work holder B and tool F toward the right. This will bring the countersink portion of the tool into closer grinding engagement with the beveled surface E' and will thus grind the portions at the rear of the cutting edges of the countersink to a greater depth than the forward or cutting edges.

While I have shown and described the invention in connection with the formation of a new tool, it is obvious that broken or worn tools can be reground by the same mechanism. Also the invention is not necessarily limited to the formation of the particular kind of tool shown, and various changes can be made in the details of the apparatus for carrying out the process.

What I claim as my invention is:—

1. A machine for grinding combined countersinks and drills, comprising a grinding mechanism for forming the drill portion of the tool and also forming the countersink portion of the tool, and means for automatically forming a radial relief portion on said tool while being ground.

2. In a machine for grinding tools, the combination with a rotatable work-holder and means for rotatively actuating the same, of an abrasive member for engaging the work having faces for engaging the work both laterally and longitudinally, and means for shifting the work-holder periodically both laterally and longitudinally of its axis to vary the abrasive effect of said faces upon the work.

3. A machine for grinding abrasive tools, comprising a pivotal frame, a work-holder rotatively carried by said frame, an abrasive member formed to engage the work both laterally and longitudinally thereof, cam members respectively stationary and rotatable with the work-holder, means for manually swinging said pivotal frame to a position establishing and maintaining engagement of said cam members, and cam means for periodically shifting the work-holder longitudinally of its axis of the rotation.

4. In a grinding machine, the combination with a frame, of a work holder rotatively carried by said frame, means for rotatively actuating the work holder, an abrasive member for engaging the work having faces for bearing both laterally and longitudinally on the work, means for periodically actuating said work holder to vary the abrasive effect upon the laterally engaged faces of the work, and means for periodically longitudinally shifting the work holder to vary the abrasive effect upon the longitudinally engaged faces of the work.

5. A machine for grinding abrasive tools, comprising an adjustable frame, a work holder rotatively carried by said frame, an abrasive member shaped to engage the work both laterally and longitudinally thereof, cam members respectively stationary and rotatable with the work holder, means for manually actuating said frame to a position establishing and maintaining engagement of cam members, and cam means for periodically shifting the work holder longitudinally of its axis of rotation.

In testimony whereof I affix my signature.

STUART A. COGSDILL.